H. P. WOODWORTH.
MOTOR AND TRANSMISSION SUPPORT.
APPLICATION FILED SEPT. 18, 1916.
1,247,055.
Patented Nov. 20, 1917.
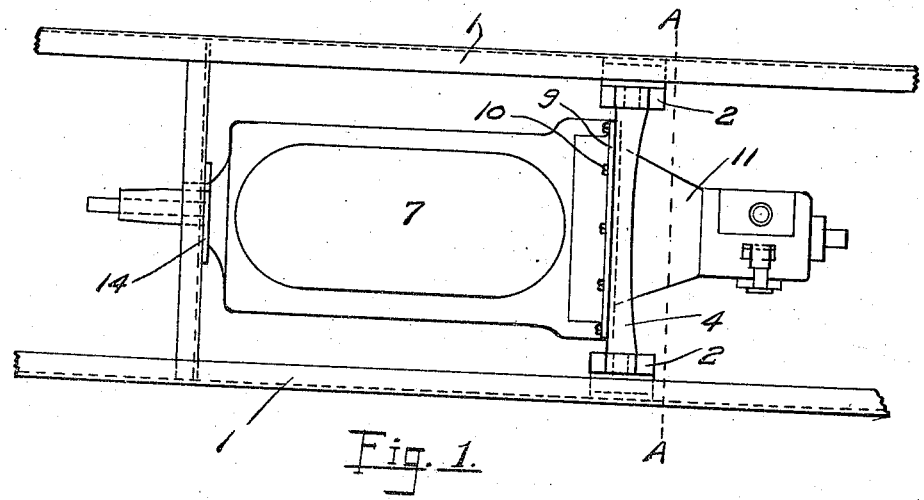
Fig. 1.
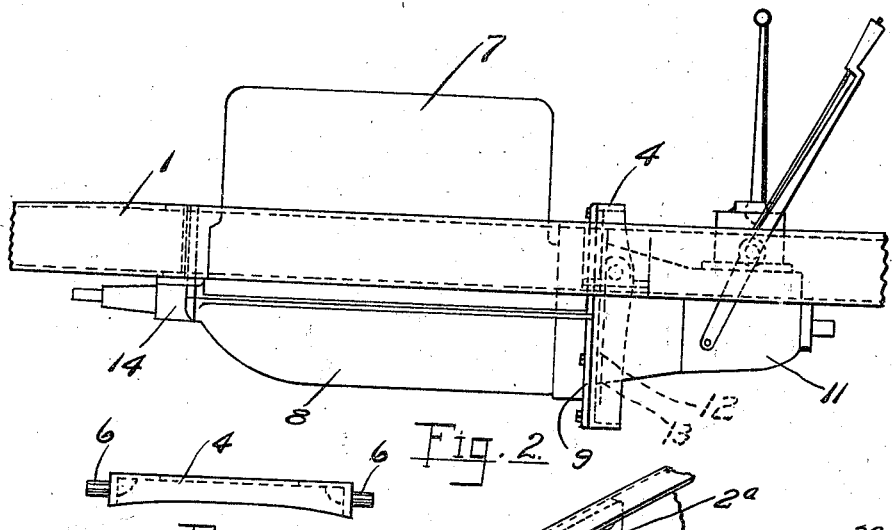
Fig. 2.
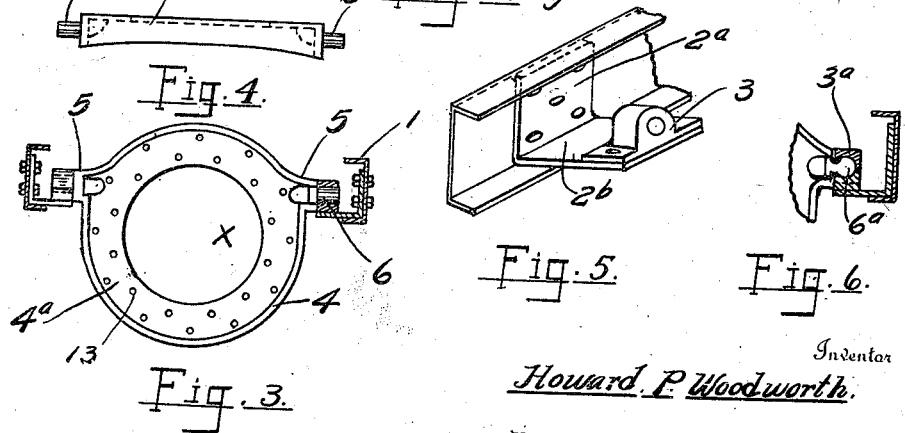
Fig. 4.　Fig. 5.　Fig. 6.
Fig. 3.
Inventor
Howard P. Woodworth.
By Edward R. Monroe
Attorney

UNITED STATES PATENT OFFICE.

HOWARD P. WOODWORTH, OF BAY CITY, MICHIGAN, ASSIGNOR OF ONE-HALF TO UNION MOTOR TRUCK CO., OF BAY CITY, MICHIGAN.

MOTOR AND TRANSMISSION SUPPORT.

1,247,055.  Specification of Letters Patent.  Patented Nov. 20, 1917.

Application filed September 18, 1916. Serial No. 120,806.

*To all whom it may concern:*

Be it known that I, HOWARD P. WOODWORTH, a citizen of the United States of America, residing at Bay City, in the county of Bay and State of Michigan, have invented certain new and useful Improvements in Motor and Transmission Supports, of which the following is a specification.

This invention relates to improvements in motor and transmission supports.

The invention is particularly adapted for use in connection with motors mounted upon a frame which is submitted to twisting and bending strains, such as are incurred in motor car frames.

One object of this invention is to provide a hanger or support that will protect the engine and transmission from the strains incurred by the twisting and bending of the frame and at the same time keep the engine or motor and transmission in proper alinement.

Another object is to provide a support or hanger which may form an integral part of the motor base or which can be attached thereto, which is pivotally suspended from bearings attached to each side of the chassis.

A further object is to provide a support or hanger which may form an integral part of the motor base or which can be attached thereto having outwardly extending portions provided with bearing pins fitting into suitable bearings attached to the chassis.

With the above and other objects in view the present invention consists in the combination and arrangement of parts hereinafter more fully described, illustrated in the accompanying drawings, and particularly pointed out in the appended claims, it being understood that changes may be made in the shape, size, materials, proportions and minor details without departing from the spirit of the invention or sacrificing any of the advantages of the invention.

In the drawings:—

Figure 1 is a plan view of a motor car frame provided with my support or hanger with the motor and transmission mounted thereon.

Fig. 2 is a side elevation of Fig. 1.

Fig. 3 is a section on line A—A of Fig. 1, the motor and transmission being detached and one of the bearings shown in section.

Fig. 4 is a plan view of the support.

Fig. 5 is a detail of the hanger or support bearing, and

Fig. 6 is a modified form of the bearing.

In the drawings, 1 indicates the chassis of an ordinary motor car frame, provided at each side thereof with L-shaped brackets 2 which are disposed exactly opposite each other. The vertical flanges $2^a$ of said brackets are bolted or otherwise secured to the inner sides of the chassis 1 while the horizontal flanges $2^b$ are adapted to support bearing boxes 3 also bolted or otherwise secured to the flanges $2^b$.

The support or hanger 4 is of annular formation and has an annular flange $4^a$ extending inwardly therefrom, providing a circular opening X in said support, through which the driving shaft of the engine is adapted to pass. Extending from opposite sides of the support or hanger near the top portion thereof are ears 5 in which are secured the bearing pins 6, which pins are received within the bearing boxes 3 of the brackets 2 whereby the support or hanger 4 is swingingly supported in the chassis 1.

The motor 7 has the usual base 8 which is provided with the ordinary flange 9 and this flange 9 is adapted to be bolted to the flange $4^a$ of the support or hanger 4 by the usual bolts or rivets 10.

The transmission box 11 is also provided with the ordinary flange 12 (shown in dotted lines in Fig. 2), and this flange is adapted to be bolted to the opposite side of the flange $4^a$ of the support or hanger 4 by means of the usual bolts or rivets 13.

The motor base is supported at its opposite end by means of the usual hanger 14. This hanger 14 is of a common form now in use and the structure thereof forms no part of the present invention.

In Fig. 6 a modified form of bearing pin and bearing box is shown. In this figure the bearing box $3^a$ and bearing pin $6^a$ are shown as made of an oval shape. This form gives greater flexibility to the frame and motor support.

What I claim is:—

1. In a device of the character described, a chassis, brackets mounted in said chassis, bearing boxes mounted on said brackets, an annular hanger suspended from said brackets, said hanger having a pair of oppositely located ears, bearing pins in said ears, said bearing pins adapted to be received in the aforesaid bearing boxes and thereby swingingly support the hanger from said chassis.

2. In combination, a chassis, a hanger swingingly mounted on the chassis and having an inwardly extending flange, a motor base secured to one side of said flange, and a transmission case secured to the opposite side of said flange.

In testimony whereof I affix my signature.

HOWARD P. WOODWORTH.